United States Patent
Lacaze et al.

(10) Patent No.: US 11,194,347 B2
(45) Date of Patent: Dec. 7, 2021

(54) ROBOTIC SWARM LOCALIZATION USING RANGING RADIOS

(71) Applicant: Robotic Research, LLC, Gaithersburg, MD (US)

(72) Inventors: Alberto Daniel Lacaze, Potomac, MD (US); Karl Nicholas Murphy, Rockville, MD (US); Joseph Putney, Waterford, VA (US); Anne Rachel Schneider, Gaithersburg, MD (US)

(73) Assignee: Robotic Research, LLC, Clarksburg, MD (US)

( * ) Notice: Subject to any disclaimer, the term of this patent is extended or adjusted under 35 U.S.C. 154(b) by 8 days.

(21) Appl. No.: 15/700,082

(22) Filed: Sep. 9, 2017

(65) Prior Publication Data
US 2019/0023903 A1 Jan. 24, 2019

Related U.S. Application Data

(63) Continuation of application No. 14/874,078, filed on Oct. 2, 2015, now Pat. No. 10,324,476.
(Continued)

(51) Int. Cl.
| | |
|---|---|
| *G05D 1/10* | (2006.01) |
| *B25J 9/16* | (2006.01) |
| *B64C 39/02* | (2006.01) |
| *G01S 5/02* | (2010.01) |
| *G01S 17/08* | (2006.01) |
| *G01S 17/933* | (2020.01) |

(52) U.S. Cl.
CPC ............ *G05D 1/104* (2013.01); *B25J 9/1617* (2013.01); *B64C 39/024* (2013.01); *G01S 5/0289* (2013.01); *B64C 2201/123* (2013.01); *B64C 2201/143* (2013.01); *G01S 17/08* (2013.01); *G01S 17/933* (2013.01); *G05B 2219/39146* (2013.01); *Y10S 901/01* (2013.01)

(58) Field of Classification Search
CPC .... G05D 1/0291; G05D 1/104; G05D 1/0278; G05D 2201/0207; G05D 1/0272; G05D 1/0027; Y10S 901/01; G05B 2219/33192; G05B 2219/39168; G05B 2219/39146; G01C 21/3438; B25J 9/1617; B64C 2201/143; B64C 2201/123; B64C 39/024; G01S 5/0289; G01S 17/933; G01S 17/08
See application file for complete search history.

(56) References Cited

U.S. PATENT DOCUMENTS

| | | | |
|---|---|---|---|
| 6,687,571 B1 * | 2/2004 | Byrne | G05D 1/0289 700/225 |
| 9,174,733 B1 * | 11/2015 | Burgess | B64D 1/12 |

(Continued)

OTHER PUBLICATIONS

Notice of Allowance or U.S. Appl. No. 15/700,080 dated Apr. 5, 2021, pp. 7.

(Continued)

*Primary Examiner* — Jason Holloway
(74) *Attorney, Agent, or Firm* — RowanTree Law Group, PLLC; Carson C. K. Fincham

(57) ABSTRACT

A system for localizing a swarm of robotic platforms utilizing ranging sensors. The swarm is localized by purposely leaving some of the platforms of the swarm stationary, providing localization to the moving ones. The platforms in the swarm can alternate between a stationary and moving state.

3 Claims, 5 Drawing Sheets

Related U.S. Application Data

(60) Provisional application No. 62/059,124, filed on Oct. 2, 2014.

(56) References Cited

U.S. PATENT DOCUMENTS

| | | | | |
|---|---|---|---|---|
| 9,481,475 | B2* | 11/2016 | Campillo | B64C 39/024 |
| 2003/0028286 | A1* | 2/2003 | Glenn | B25J 9/1689 |
| | | | | 700/245 |
| 2003/0164794 | A1* | 9/2003 | Haynes | H04B 1/7172 |
| | | | | 342/353 |
| 2003/0212472 | A1* | 11/2003 | McKee | G05D 1/0274 |
| | | | | 700/245 |
| 2004/0024490 | A1* | 2/2004 | McLurkin | G05D 1/0297 |
| | | | | 700/245 |
| 2004/0068413 | A1 | 4/2004 | Solomon | |
| 2004/0073337 | A1* | 4/2004 | McKee | G05D 1/0251 |
| | | | | 700/245 |
| 2005/0183569 | A1* | 8/2005 | Solomon | B64C 39/024 |
| | | | | 89/1.11 |
| 2006/0161405 | A1* | 7/2006 | Munirajan | G06N 3/008 |
| | | | | 703/6 |
| 2008/0137589 | A1* | 6/2008 | Barrett | H04M 3/42348 |
| | | | | 370/327 |
| 2012/0158176 | A1* | 6/2012 | Park | B25J 5/007 |
| | | | | 700/248 |
| 2012/0326923 | A1* | 12/2012 | Oehler | G01S 5/0284 |
| | | | | 342/357.29 |
| 2013/0046420 | A1* | 2/2013 | Gottifredi | G01S 5/0289 |
| | | | | 701/2 |
| 2013/0123981 | A1* | 5/2013 | Lee | H04W 4/02 |
| | | | | 700/248 |
| 2013/0226343 | A1* | 8/2013 | Baiden | H04B 7/155 |
| | | | | 700/248 |
| 2014/0098990 | A1 | 4/2014 | Vian | |
| 2015/0190925 | A1* | 7/2015 | Hoffman | B25J 9/161 |
| | | | | 700/257 |
| 2016/0207637 | A1* | 7/2016 | Campillo | B64C 39/024 |
| 2016/0243698 | A1* | 8/2016 | Hoffman | B25J 9/161 |
| 2017/0057081 | A1* | 3/2017 | Krohne | B25J 9/0084 |
| 2019/0387374 | A1* | 12/2019 | Gherardi | G01S 5/0284 |

OTHER PUBLICATIONS

Office Action for U.S. Appl. No. 14/874,078 dated Nov. 8, 2017, pp. 12.
Final Office Action for U.S. Appl. No. 14/874,078 dated Jun. 27, 2018, pp. 12.
Office Action for U.S. Appl. No. 15/700,080 dated Jun. 11, 2019, pp. 10.
Final Office Action for U.S. Appl. No. 15/700,080 dated Nov. 21, 2019, pp. 9.
Office Action for U.S. Appl. No. 15/700,080 dated May 27, 2020, pp. 7.
Final Office Action for U.S. Appl. No. 15/700,080 dated Dec. 4, 2020, pp. 9.
Office Action for U.S. Appl. No. 16/403,890 dated Nov. 10, 2020, pp. 8.
Final Office Action for U.S. Appl. No. 16/403,890 dated Jun. 15, 2021, pp. 8.
Notice of Allowance for U.S. Appl. No. 14/874,078 dated Feb. 7, 2019, pp. 8.
Final Office Action for U.S. Appl. No. 16/403,890 dated Jun. 15, 2021; 9 pps.
Notice of Allowance for U.S. Appl. No. 15/700,080 dated Jul. 27, 2021; 5 pps.

* cited by examiner

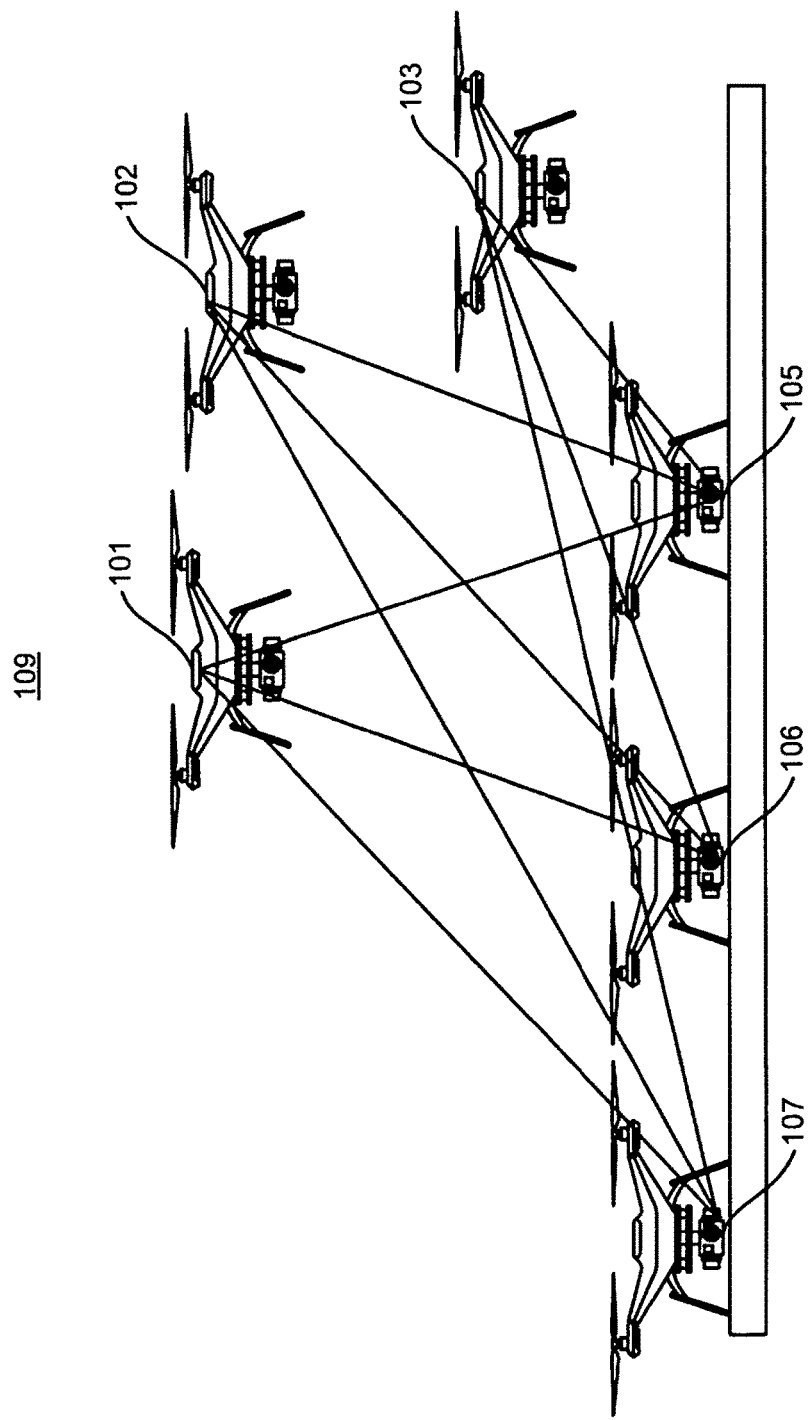

ROBOTIC SWARM LOCALIZATION USING RANGING RADIOS

CROSS REFERENCE TO RELATED APPLICATIONS

This application claims priority from and is a continuation of U.S. patent application Ser. No. 14/874,078, entitled "Robotic Swarm Localization Using Ranging Radios", filed on 2 Oct. 2015. The benefit under 35 USC § 119(e) of the United States provisional application is hereby claimed, and the aforementioned application is hereby incorporated herein by reference.

U.S. patent application Ser. No. 14/874,078 claims priority from U.S. Patent Application Ser. 62/059,124, entitled "Robotic Swarm Localization Using Ranging Radios", filed on 2 Oct. 2014. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to the autonomous control of small robotic platforms. More specifically, the present invention relates to robotic localization.

BACKGROUND OF THE INVENTION

There are several challenges related to the autonomous control of small robotic platforms. The small payload and usually low cost restrict them from carrying accurate, inertial localization systems. Therefore, in GPS denied areas, automatic tasks—like mapping and searching—become a challenge.

Several technologies have been developed to overcome these challenges. Visual odometry and LADAR odometry are commonly used to complement the higher drift of the inertial components, aiding in localization. The problem with these techniques is that they are brittle in some environments; in particular, tunnels, caves, and man-made structures pose some challenges. Poor lighting conditions, low quality cameras, and dusty or smoky conditions further exacerbate the localization errors. For example, state-of-the-art quadrotors equipped with quality cameras, flying in a sufficiently-lit tunnel, while using visual odometry, may achieve 5% to 10% error as a function of distance travelled. This error becomes 1 0% to 25% of distance travelled if the quad-rotor must carry its own illumination. If the tunnel is dusty or smoky, the error in localization is driven by the inertial components.

The inertial components of the navigation unit are composed of accelerometers and gyroscopes. The position is computed by double integrating the acceleration. Therefore, small bias errors in acceleration become exponential errors in position. If the visual or LADAR odometry is blocked by smoke or dust, and no longer seeing features, the position error will grow exponentially. This is due to the double integration errors, and the lack of other sensors contributing to the bias estimates.

The problems with localization become very evident on flying platforms, as they do not have wheel odometry to maintain the inertial biases. In small robotic platforms where the wheel slippage is large, the localization estimates also suffer accordingly.

SUMMARY OF THE INVENTION

The invention provides a mechanism for maintaining the localization of moving platforms, by utilizing stationary platforms, moving platforms, and ranging radios. The stationary platforms help provide localization to the moving platforms. The number of stationary platforms can be increased to provide higher accuracy, or to extend the localization workspace. By alternating stationary and moving platforms, the localization workspace can be accommodated to the task.

Ranging radios often provide a single measurement of range, without providing the direction of the other device. However, there are ranging radios that can provide both range and direction. If this type of ranging radios are used, then a single platform can be left stationary, while the others can move. The ranging radios can be implemented with a variety of technologies, including electromagnetic waves with active or passive responses (i.e. radar), utilizing LADAR, vision against known features in the moving platform, and even acoustic sensors. This localization system can be utilized with a variety of sensors that provide point-to-point measurement between the platforms.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 1A, 1B, and 1C illustrate the localization swarm on the fly;

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Ranging radios operating at ultra wide band (UWB) frequencies can provide accurate point-to-point measurements. The accuracy of the range measurements depends on the frequencies used and the radio's design. Commercial, off-the-shelf ranging radios are available utilizing UWB, but there are also ranging radios based on BLUETOOTH, WIFI, and other frequencies and encoding methods. State-of-the-art ranging radios are small in size and low in cost. This makes them prime candidates for installation in small robotic systems.

By installing ranging radios, we can directly measure the distance between the robotic platforms, but they do not provide localization by default. The invention provides a swarm movement methodology for maintaining relative and absolute localization of the group.

As presented earlier, the inertial components of navigation units drift with time as a platform is flying. However, when the navigation unit is not moving (i.e. the platform has landed), we are aware that the position is immobile; acceleration biases can then be computed (zero velocity update). Moreover, if a sufficient number of platforms are not moving, the TO position of the moving platforms can be computed by triangulating the position of the ones that are stationary.

Figure 1A:
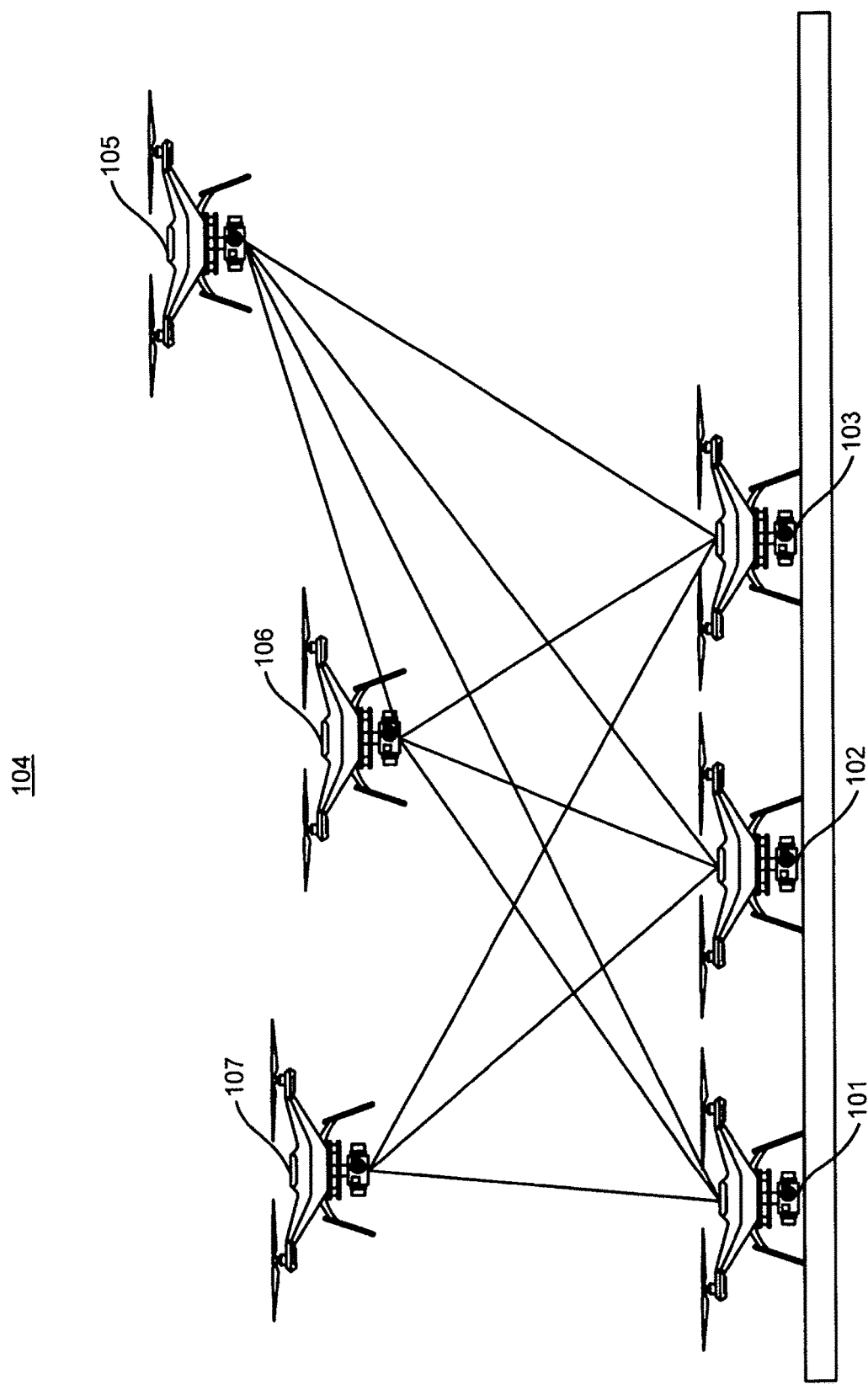
Figure 1B:
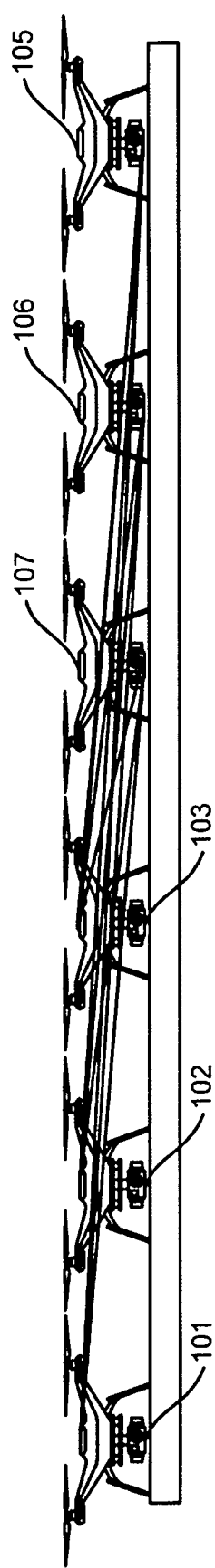

Specifically, let's assume that the position of three quadrotors is known. The quads are on the ground 101, 102, and 103 in a triangular configuration shown in FIG. 1*a*, 104. There are three other quads 105, 106, and 107 that "leap frog" over the three landed quads 101, 102, and 103. Since the location of all the robots/quads on the ground 101, 102, and 103 is known, and the ranging radios provide ranges from each landed quad 101, 102, and 103 to each flying quad 105, 106, and 107, the location of the three flying quads 105, 106, and 107 is also known. As the flying quads land as shown in FIG. 1*b*, 108, the location of their landing will be known, releasing the originally landed quads 101, 102, and 103 to fly, starting the cycle once again as shown in FIG. 1*e*, 109.

Even though the example of FIGS. 1*a*-1*e* shows the quads "leap frogging," the same algorithm can be used with at least three stationary robots, where the flying robots perform other tasks (like mapping the room), leaving the three stationary robots in place, acting as sources of localization.

Figure 2:
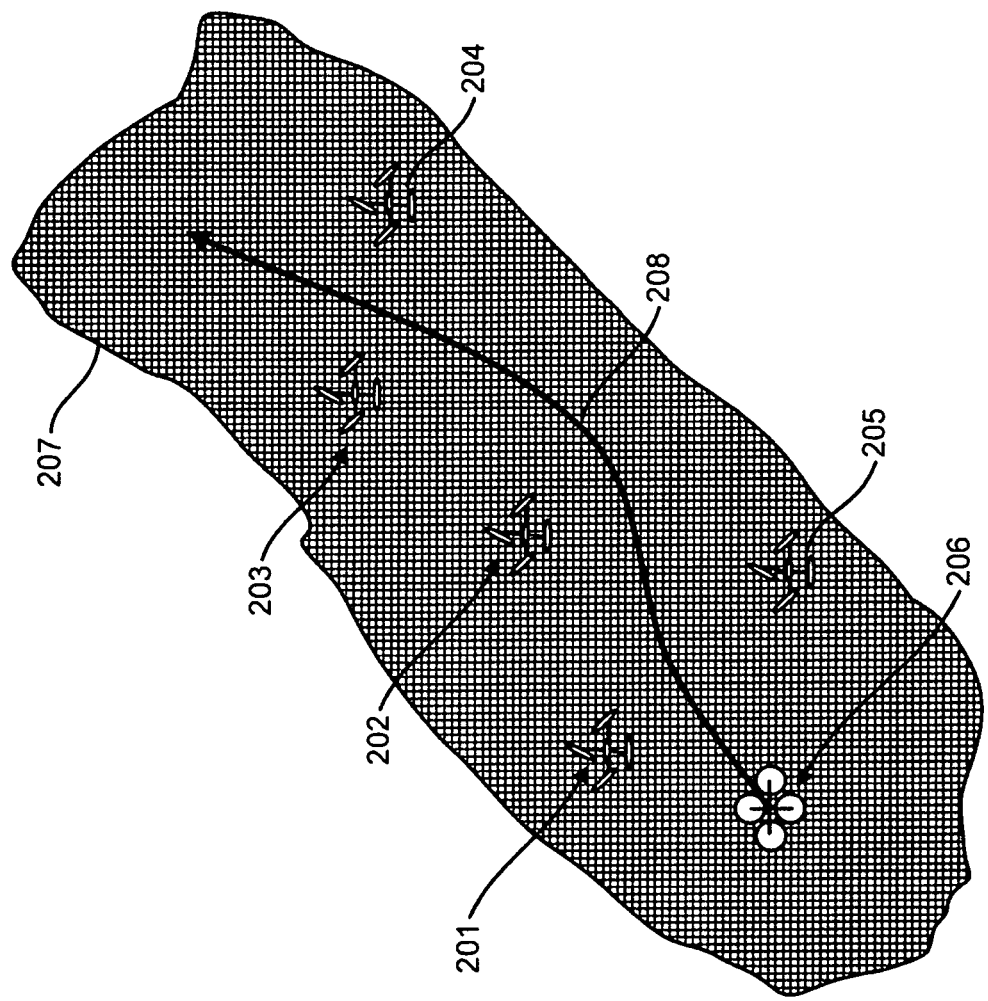
FIG. 2 illustrates a group of quads is maintained stationary on the ground to provide a localization pathway for the fling quads.

In a similar fashion, more than three robots can be used in a stationary manner to create a localization "carpet" 207 that can provide both localization and communication relay. FIG. 2 shows one such example. In this case, a group of stationary quads 201, 202, 203, 204, and 205 which may be low on battery, are being used to provide localization for the incoming wave of flying quads 206 that are traversing a path 208.

Different vehicle topologies (stationary vehicles) will provide different error propagation for the swarm. In order to optimize the topology and therefore minimize the error in localization, the system can search for the most effective topology. The literature already presents a variety of optimization algorithms that can be used for this purpose. In particular, a lot of work in this area was conducted in the early 70s and 80s to find the best topology for GPS satellites. In the present incarnation the topology is generated by expanding a multi-vehicle search. Other search algorithms like visibility graph-based, DIJKSTRA, neural networks, or even simplex methods can be used.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

Figure 3:
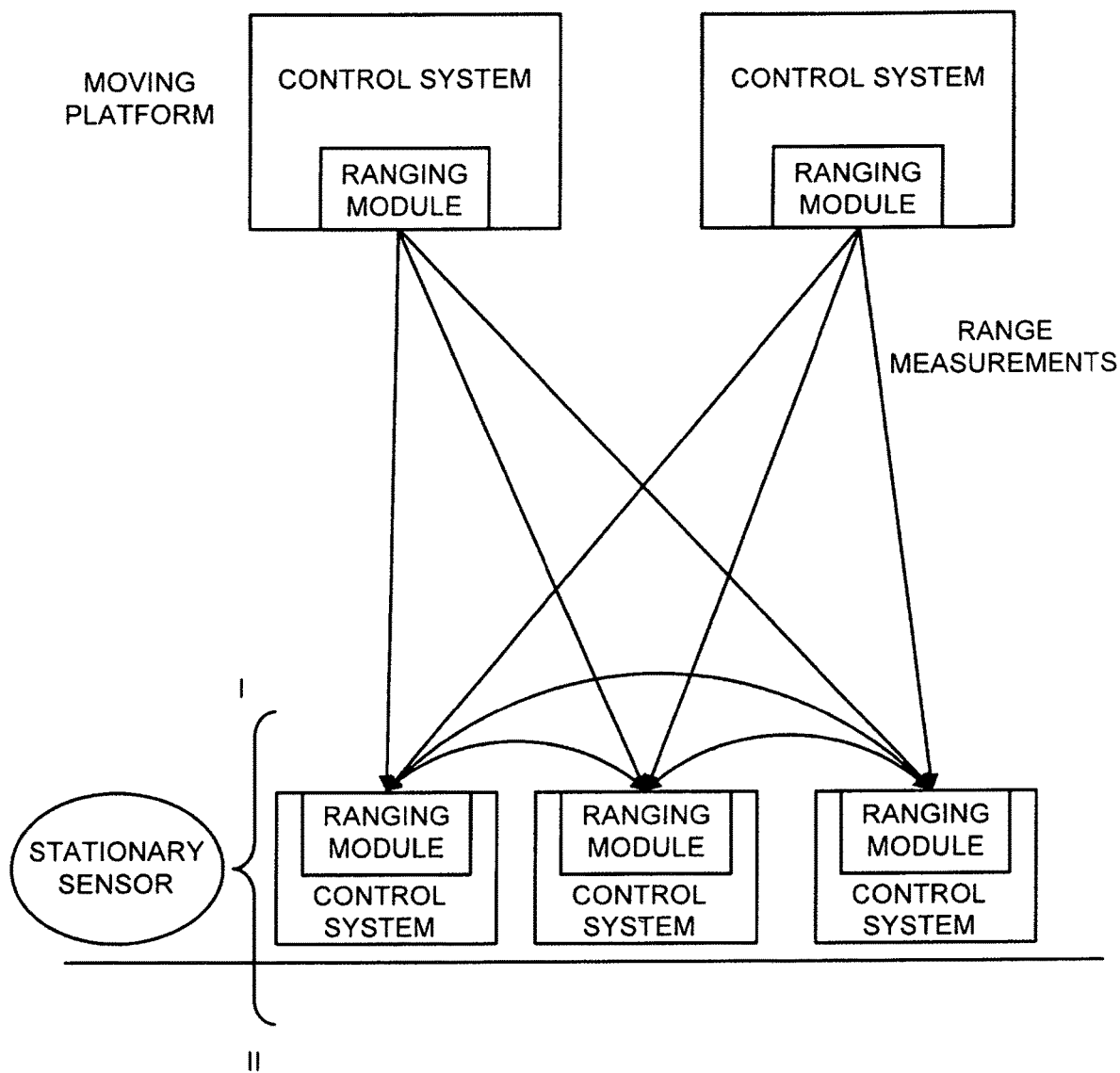
FIG. 3 illustrates the logic/flow diagram of the method that is being claimed.

FIG. 3 shows a logic/flow diagram showing the range measurements that are taken by the stationary sensor found in a control system with a ranging module on the moving platform containing control systems with ranging modules.

The embodiments of the invention in which an exclusive property or privilege is claimed are defined as follows:

1. A method for robotic swarm localization using ranging sensors, comprising:
   operating a group of at least three robotic platforms, each robotic platform comprising a deployable payload comprising a ranging radio;
   deploying, by each robotic platform, the payloads, such that the payloads are stationary;
   moving, at a first time, each robotic platform; and
   localizing the group of robotic platforms by:
      measuring, by each payload and utilizing the ranging radios at the first time, the distances to the moving robotic platforms; and
      calculating, based on the measured distances to the moving robotic platforms, a position of each of the moving robotic platforms.

2. The method for robotic swarm localization of claim 1, further comprising:
   mapping, by at least one of the at least three robotic platforms, a room.

3. The method for robotic swarm localization of claim 1, wherein at least one of the at least three robotic platforms comprises at least one of a ground, underwater, surface, or flying platform.

* * * * *